United States Patent
Davison et al.

(10) Patent No.: US 10,527,226 B2
(45) Date of Patent: Jan. 7, 2020

(54) HEIGHT ADJUSTABLE REMOVABLE KICK PANEL

(71) Applicants: BSH Home Appliances Corporation, Irvine, CA (US); BSH Hausgeräte GmbH, Munich (DE)

(72) Inventors: Daniel Davison, Knoxville, TN (US); Jesus Garcia, Knoxville, TN (US); Robert Ladner, Knoxville, TN (US)

(73) Assignees: BSH Home Appliances Corporation, Irvine, CA (US); BSH Hausgeräte GmbH, Munich (DE)

(*) Notice: Subject to any disclaimer, the term of this patent is extended or adjusted under 35 U.S.C. 154(b) by 29 days.

(21) Appl. No.: 15/832,798

(22) Filed: Dec. 6, 2017

(65) Prior Publication Data
US 2019/0170293 A1  Jun. 6, 2019

(51) Int. Cl.
| | |
|---|---|
| *F16M 13/02* | (2006.01) |
| *F25D 23/06* | (2006.01) |
| *F24C 15/00* | (2006.01) |
| *A47L 15/42* | (2006.01) |
| *D06F 39/12* | (2006.01) |

(52) U.S. Cl.
CPC ....... *F16M 13/022* (2013.01); *A47L 15/4251* (2013.01); *D06F 39/12* (2013.01); *F24C 15/007* (2013.01); *F25D 23/065* (2013.01)

(58) Field of Classification Search
CPC ... F16M 13/022; A47L 15/4251; D06F 39/12; F25D 23/065
See application file for complete search history.

(56) References Cited

U.S. PATENT DOCUMENTS

| | | | | |
|---|---|---|---|---|
| 2,295,915 | A * | 9/1942 | Ring | F24C 15/08 126/19 R |
| 2,847,240 | A * | 8/1958 | Stone | E05C 19/066 285/919 |
| 3,698,567 | A * | 10/1972 | Fenwick | A47F 5/103 211/183 |
| 4,290,660 | A * | 9/1981 | Brezosky | A47B 95/002 312/249.8 |
| 4,932,224 | A * | 6/1990 | Katterhenry | F25D 23/00 312/236 |

(Continued)

FOREIGN PATENT DOCUMENTS

| | | |
|---|---|---|
| DE | 9000702 U1 | 3/1990 |
| EP | 1583456 B1 | 8/2009 |

(Continued)

OTHER PUBLICATIONS

Jenn-Air Detailed Planning Dimensions Guide dated Jul. 2012.
Viking Range Dishwasher Installation Guide dated Oct. 15, 2013.

*Primary Examiner* — Hanh V Tran
(74) *Attorney, Agent, or Firm* — Michael E. Tschupp; Andre Pallapies; Brandon G. Braun

(57) ABSTRACT

Techniques are provided for constructing an adjustable kick panel assembly that is removable, adjustable, and attachable without the use of a tool. In one or more implementations, a bracket having a clip is inserted into a slot on a kick panel, and then twisted to secure the bracket to the kick panel. The bracket allows for height adjustment of the kick panel without a tool. The complete kick panel assembly is then attached to the base of an appliance by inserting the clip into a housing on the base.

20 Claims, 4 Drawing Sheets

(56) References Cited

U.S. PATENT DOCUMENTS

| | | | | |
|---|---|---|---|---|
| 5,243,771 | A * | 9/1993 | Kretchman | D06F 58/04 126/190 |
| 5,377,662 | A * | 1/1995 | Mills | F24H 9/02 126/110 R |
| 5,613,747 | A * | 3/1997 | Becker | A47L 15/4265 312/228 |
| 6,666,531 | B2 * | 12/2003 | Flowers | A47L 15/4272 134/201 |
| 6,758,353 | B2 * | 7/2004 | Orr | A47B 47/03 211/183 |
| 7,226,233 | B2 * | 6/2007 | SuBenbach | F16B 21/186 403/122 |
| 8,118,332 | B2 * | 2/2012 | Morgan | E05C 19/063 292/17 |
| 2002/0005024 | A1 * | 1/2002 | Hsueh | E04F 13/0807 52/764 |
| 2003/0222552 | A1 * | 12/2003 | Wessel | A47B 95/002 312/278 |
| 2004/0239214 | A1 * | 12/2004 | Lines | A47F 9/00 312/236 |
| 2005/0225094 | A1 * | 10/2005 | Lewis | E05B 17/0004 292/19 |
| 2009/0096331 | A1 * | 4/2009 | Park | D06F 39/12 312/107 |
| 2011/0101836 | A1 * | 5/2011 | Gamble | A47B 95/002 312/293.3 |
| 2012/0280607 | A1 * | 11/2012 | Doberstein | F25D 23/00 312/401 |
| 2013/0113353 | A1 * | 5/2013 | Carr | A47L 15/4265 312/293.3 |
| 2014/0028168 | A1 * | 1/2014 | Klinke | A47B 91/005 312/319.5 |
| 2014/0334135 | A1 * | 11/2014 | Fanourgiakis | A47B 45/00 362/127 |
| 2018/0125329 | A1 * | 5/2018 | Parmeggiani | A47L 15/488 |

FOREIGN PATENT DOCUMENTS

| | | |
|---|---|---|
| EP | 2628433 A1 | 8/2013 |
| IE | 4433173 C1 | 10/1995 |
| JP | 08299684 | * 11/1996 |

* cited by examiner

HEIGHT ADJUSTABLE REMOVABLE KICK PANEL

FIELD OF TECHNOLOGY

The present technology relates to improvements in appliance features, particularly as those features relate to an appliance kick panel.

BACKGROUND

An appliance kick panel is traditionally mounted on the bottom of an appliance in close proximity to the floor. Traditional kick panels can be removed from the appliance via a variety of methods, for example, by using a tool to detach the kick panel, pulling the kick panel away from the appliance to release the kick panel, slightly raising the kick panel to release a catch attaching the kick panel to the appliance, etc.

Traditional kick panels can also be height adjustable, allowing the kick panel to be raised and lowered. However, a tool is generally required to adjust the height of a traditional kick panel.

Accordingly, what is needed is a kick panel that is both removable without a tool and height adjustable without a tool.

BRIEF SUMMARY

The present invention is directed to improvements for a kick panel. These improvements include being able to remove a kick panel from an appliance without a tool, being able to attach a kick panel to an appliance without a tool, and being able to vertically adjust the kick panel without a tool.

These improvements are accomplished by mounting an adjustable bracket to a kick panel via a slot in the kick panel, twisting the adjustable bracket to secure the bracket to the kick panel, attaching one end of a metal clip to the adjustable bracket, and attaching the complete kick panel assembly to the appliance by inserting the opposite end of the metal clip into a housing located in the base of the appliance.

This kick panel assembly results in a decorative kick panel that can be both removed from and attached to the base of the appliance without a tool. This kick panel assembly also results in the kick panel being vertically adjustable without a tool by sliding the adjustable bracket along the slot in the kick panel.

Various other objects, features, aspects, and advantages of the present invention will become more apparent to those skilled in the art upon review of the following detailed description of preferred embodiments of the invention and accompanying drawings in which like numerals represent like components.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Throughout this disclosure, the terms top, bottom, front, back, left and right may be used. These terms are only intended to provide relational orientation with respect to one another. For example, any two opposed sides can be a right side and a left side and by changing to an opposed viewpoint, right versus left will be changed. Thus, top, bottom, front, back, left and right should not be considered limiting and are used only to distinguish their relationship to one another.

Figure 1:
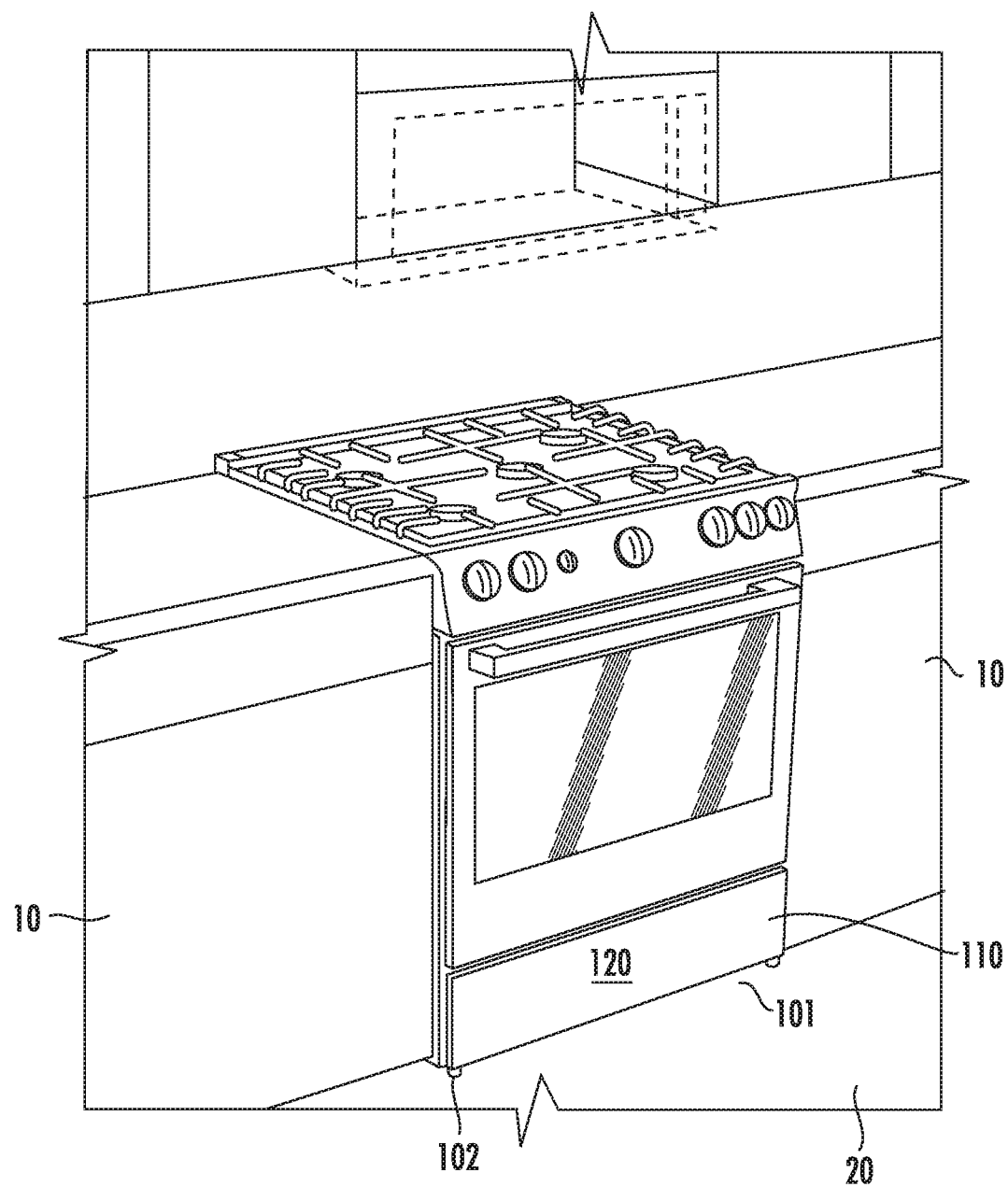
FIG. 1 is a perspective, front view of a household appliance with an adjustable kick panel assembly constructed in accordance with this disclosure.

FIG. 1 illustrates a front perspective of an appliance (100) situated in a set of cabinets (10). The appliance rests on a floor (20) via a plurality of feet at the bottom of the appliance, two of which are depicted (101 & 102).

The appliance (100) is depicted as a slide-in range that is installed in the set of cabinets (10), however, any suitable appliance can be used, for example, a refrigerator, a dishwasher, a washing machine, etc. Additionally, the appliance may be installed as a slide-in appliance, a free standing appliance, a wall appliance, a built-in appliance, or any other suitable installation system.

Located at the bottom of the appliance (100), and partially obscuring the feet (101 & 102), is a kick panel assembly (110). The kick panel assembly is attached to the appliance at the base of the appliance.

The kick panel assembly (110) can be detached from the appliance (100) without the use of the tool. In the exemplary embodiment, the kick panel assembly can be detached by pulling the kick panel assembly away from the appliance until the kick panel assembly is released.

The kick panel assembly (110) can also be adjusted vertically (i.e., raised or lowered), as necessary. As a result of said adjustment, the appliance feet (101 & 102) can be obscured, either partially or in totality, by the kick panel assembly.

The kick panel (120) of the kick panel assembly (110) is constructed out of metal, in particular sheet metal; however, any other suitable material can be used. The kick panel can be smooth, brushed, etched, or decorated in any appropriate or desired means.

The rear of the kick panel (120), which is obscured in the front perspective of FIG. 1, can have clips for holding ratings labels, instructions, or other informative materials as desired or required. Alternatively, ratings labels, instructions, or other informative material may be affixed in some manner to the rear of the kick panel. These ratings labels, instructions, or other informative materials can be viewed or accessed by detaching the kick panel assembly (110) from the appliance (100).

Figure 2:
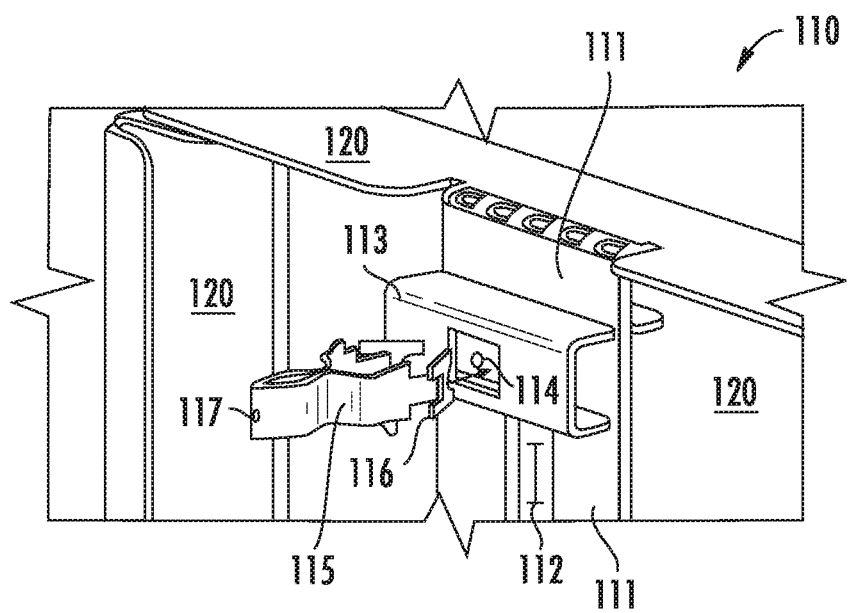
FIG. 2 is a perspective, rear view of a partially assembled adjustable kick panel assembly constructed in accordance with this disclosure.

FIG. 2 illustrates a rear perspective of the kick panel assembly (110), wherein the kick panel assembly is detached from the appliance (100). The kick panel assembly has an attachment structure (111) that is integrated with the kick panel (120). In an exemplary embodiment the attachment structure is constructed out of the same material as the kick panel (e.g., sheet metal). The attachment structure can be formed as part of the kick panel or as a separate component that is affixed to the kick panel via any suitable method (e.g., welding).

The attachment structure (111) has a slot (112). Attached to the attachment structure via the slot is a bracket (113).

The bracket (113) has an attachment point (114) that accepts a clip (115). In an exemplary embodiment, the clip is constructed out of metal and has a first attachment end (116) and a second attachment end (117). The clip is attached to the bracket by inserting the first attachment end of the clip into the attachment point on the bracket. In an exemplary embodiment, the first attachment end is press fit into the attachment point; however, the clip may be held in place via spring tension or any other appropriate manner.

Figure 3:
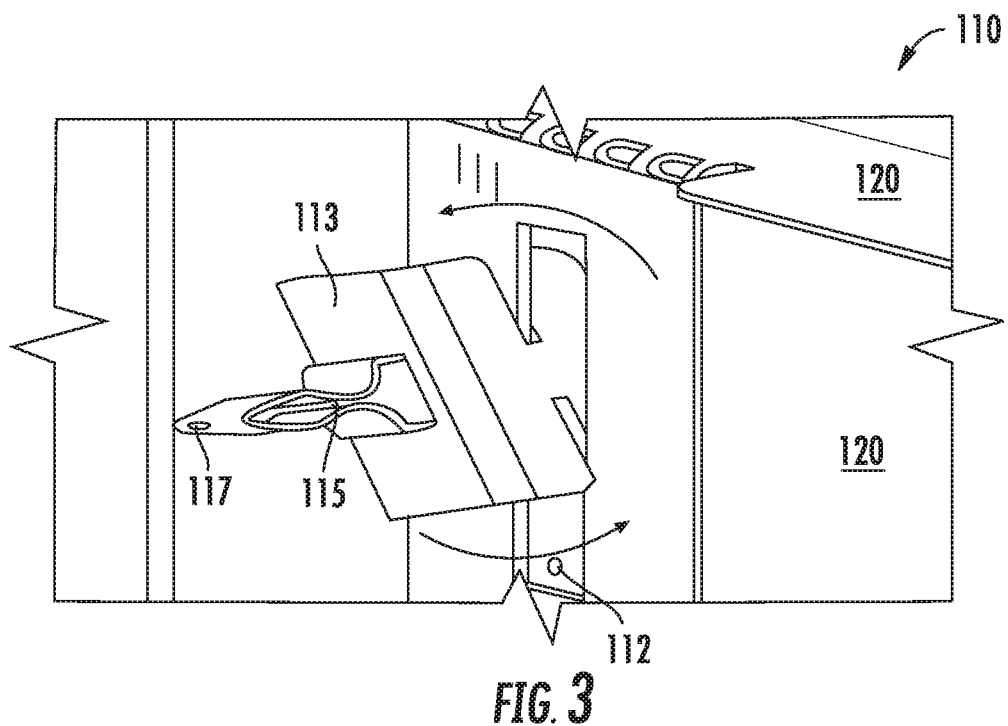
FIG. 3 is an additional perspective, rear view of a partially assembled adjustable kick panel assembly constructed in accordance with this disclosure.

FIG. 3 further illustrates a rear perspective of the kick panel assembly (110). As depicted in FIG. 3, the bracket (113) is attached to the attachment structure (111) by inserting the bracket into the slot (112) on the attachment structure, and then by twisting the bracket into place. In the exemplary embodiment, the bracket is inserted vertically into the slot and twisted approximately 90 degrees, resulting in the bracket being perpendicularly aligned with the slot.

Additionally, the bracket (113) can be easily removed from the kick panel assembly (110) by twisting the bracket in a reverse direction to align the bracket with the slot (112) and pulling the bracket out of the slot.

Figure 4:
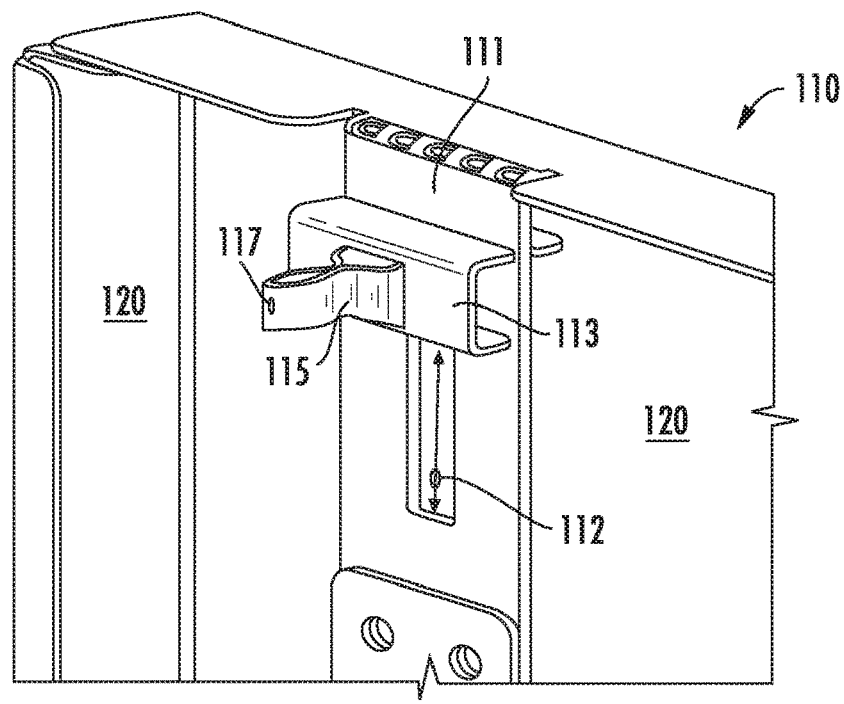
FIG. 4 is a perspective, rear view of an assembled adjustable kick panel assembly.

As depicted in FIG. 4, the bracket (113) is held in place on the kick panel assembly (110) via friction. However, the bracket is adjustable in a vertical manner along the slot (112).

Figure 5:
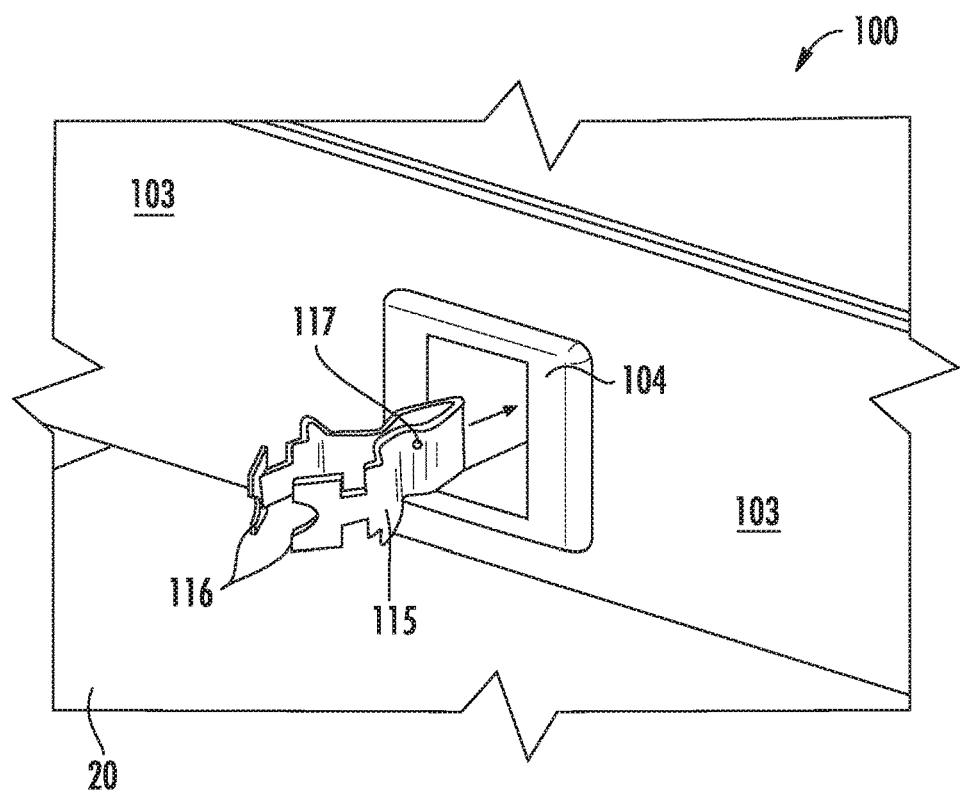
FIG. 5 is a perspective, front view of a base of a household appliance constructed in accordance with this disclosure.

FIG. 5 illustrates a front perspective of the base (103) of the appliance (100). The kick panel assembly (110) is attached to the appliance via the base, and the kick panel generally obscures the base from view when attached.

The base (103) is constructed out of metal, in particular sheet metal; however any other suitable material can be used.

A housing (104) is affixed to the base (103). In an exemplary embodiment the housing is press fit into a cutout in the base. In an exemplary embodiment the housing is constructed out of plastic; however, any other suitable material can be used.

As previously described and depicted in FIGS. 2-4, the bracket (113) is attached to the kick panel assembly (110), and the bracket has a clip (115) with a first attachment end (116) inserted into the bracket, and a second attachment end (117) that is unattached.

To attach the kick panel assembly (110) to the base (103), the second attachment end (117) of the metal clip (115) is inserted into the housing (104) on the base. As a result, the whole kick panel assembly is held in place against the base.

Additionally, the kick panel assembly (110) can be removed from the appliance (100) by applying a measure of force to pull the kick panel assembly away from the base (110). As a result of this applied force, the second attachment end (117) cannot hold the kick panel assembly to the base and releases the kick panel assembly.

Furthermore, while the bracket (113) can be adjusted on the kick panel assembly (110) when the kick panel assembly is unattached, the kick panel assembly can also be adjusted in a vertical fashion (i.e., "up" or "down") while attached to the base.

As a result, these improvements allow for an adjustable kick panel assembly that is height adjustable either attached to or unattached from the appliance. The height of the kick panel assembly can also be adjusted without a tool, and the kick panel assembly can be either removed or attached to the appliance without a tool.

Example Procedures

The following discussion describes techniques for assembling an adjustable kick panel for an appliance. The procedures are shown as a set of blocks that specify operations to be performed by one or more persons or one or more devices and are not necessarily limited to the orders shown for performing the operations by the respective blocks. In portions of the following discussion, reference will be made to FIGS. 1-5 and respective reference numbers.

Figure 6:
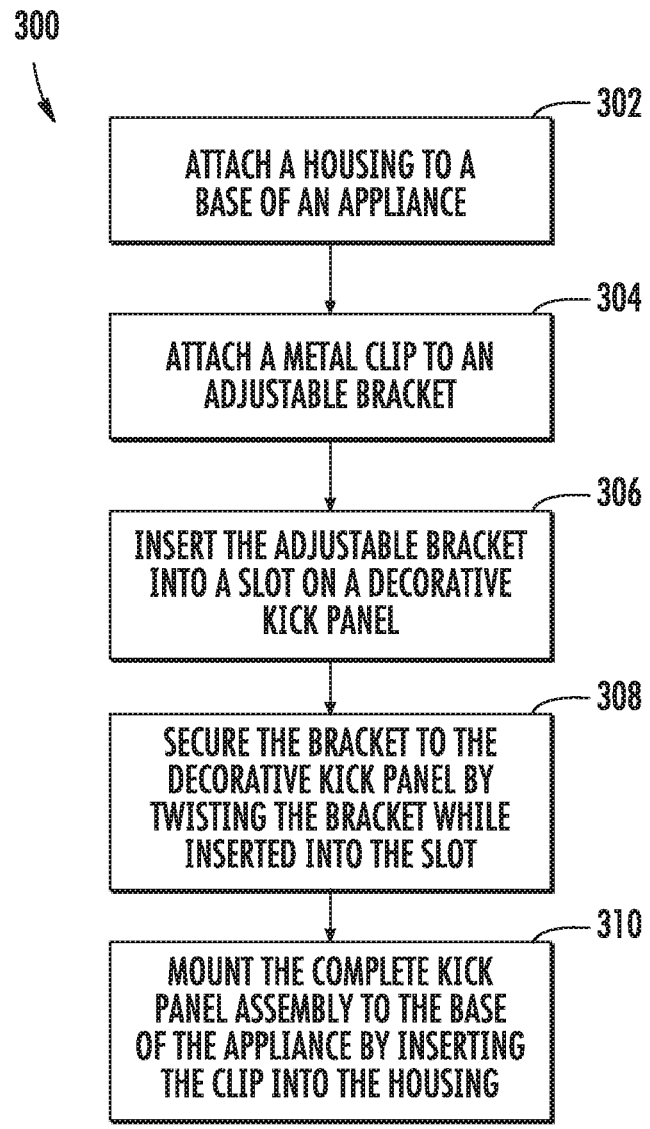
FIG. 6 is a flow diagram depicting a procedure in an example implementation in which an adjustable kick panel assembly is constructed.

FIG. 6 depicts a procedure 300 in an example assembly in which an adjustable kick panel for an appliance is constructed.

At 302 a housing (104) is attached to a base (103) of an appliance (100). The housing is attached via press fit into an opening on the base of the appliance, or by any other appropriate method of attachment (e.g., adhered, welded, etc.).

At 304 a metal clip (115) is attached to an adjustable bracket (113). The metal clip has two attachment ends (116 & 117) and the first attachment end (116) is inserted into an opening (114) on the adjustable bracket.

At 306 the adjustable bracket (114) is inserted into a slot (112) on a decorative kick panel (120).

At 308 the adjustable bracket (114) is secured to the decorative kick panel (120) by twisting the adjustable bracket within the slot (112).

At 310 the complete kick panel assembly (110) is mounted to the base (103) of the appliance (100) by inserting the free second end (117) of the metal clip (115) into the housing (104) on the base.

While the present technology has been described in connection with several practical examples, it is to be understood that the technology is not to be limited to the disclosed examples, but on the contrary, is intended to cover various modifications and equivalent arrangements included within the spirit and scope of the technology.

What is claimed is:

1. A household appliance, comprising:
   an appliance body, the appliance body having a base;
   a housing affixed to the base; and
   a kick panel attached to the base via the housing, the kick panel having an adjustable bracket with a metal clip that fits into the housing.

2. The household appliance of claim 1, wherein the housing is press fit into the base.

3. The household appliance of claim 1, wherein the adjustable bracket is slidable along a slot on the kick panel.

4. The household appliance of claim 3, wherein the kick panel is vertically adjustable when attached to the base.

5. The household appliance of claim 1, wherein the adjustable bracket is rotatably attached to the kick panel.

6. The household appliance of claim 1, wherein the adjustable bracket is adjustable without a tool.

7. The household appliance of claim 1, wherein the kick panel can be unattached from the base without a tool.

8. A removable panel for an appliance, comprising:
   a kick panel having an attachment structure;
   an adjustable bracket attached to the kick panel via the attachment structure; and
   a clip attached to the bracket, wherein the kick panel is attached to the appliance via the clip.

9. The removable panel of claim 8, wherein the attachment structure is a slot.

10. The removable panel of claim 9, wherein the bracket is attached to the kick panel by inserting the bracket into the slot, and then rotating the bracket in the slot.

11. The removable panel of claim 8, wherein the kick panel can be unattached from the appliance without a tool.

12. The removable panel of claim 8, wherein the bracket is adjustable without a tool.

13. The removable panel of claim 9, wherein the bracket is adjustable along the length of the slot.

14. A method of assembling an adjustable kick panel for an appliance, comprising:
   attaching a housing to a base of the appliance;
   fitting a clip into a bracket;
   mounting the bracket to the kick panel; and
   attaching the kick panel to the base of the appliance by inserting the clip into the housing.

15. The method of claim 14, wherein the bracket is mounted to the kick panel by inserting the bracket into a slot on the kick panel, and then by rotating the bracket in the slot.

16. The method of claim 15, wherein the bracket is adjustable along a length of the slot.

17. The method of claim 14, wherein the kick panel can be unattached from the base without a tool.

18. The method of claim 16, wherein the bracket is adjustable without a tool.

19. The method of claim 14, wherein the housing is attached to the base by press fitting the housing into an opening on the base.

20. The method of claim 15, wherein the bracket is removable from the kick panel without a tool.

* * * * *